United States Patent [19]

Brugger et al.

[11] 4,238,167
[45] Dec. 9, 1980

[54] TOOLHOLDER ADAPTER

[75] Inventors: Dennis M. Brugger, Pewaukee; John J. Hughes, Greendale, both of Wis.

[73] Assignee: Kearney & Trecker Corporation, West Allis, Wis.

[21] Appl. No.: 24,562

[22] Filed: Mar. 28, 1979

[51] Int. Cl.³ .................... B23Q 3/12; B23B 31/00
[52] U.S. Cl. ............................ 409/232; 279/1 A; 279/8
[58] Field of Search ............ 409/231, 232, 233, 234; 29/568; 279/1 A, 8, 1 TS

[56] References Cited

U.S. PATENT DOCUMENTS

| | | | |
|---|---|---|---|
| 3,038,386 | 6/1962 | Parske et al. | 409/231 X |
| 3,112,117 | 11/1963 | Wahlstrom et al. | 279/8 X |
| 3,405,950 | 10/1968 | Cox | 409/232 |
| 3,528,670 | 9/1970 | Wale | 279/8 |
| 3,851,562 | 12/1974 | Tomita et al. | 279/1 TS |
| 3,884,120 | 5/1975 | DiFerdinando | 279/1 AX |
| 3,895,881 | 7/1975 | Langlois | 409/232 X |
| 4,117,586 | 10/1978 | Uchida | 29/568 |

FOREIGN PATENT DOCUMENTS

| | | | |
|---|---|---|---|
| 960027 | 12/1974 | Canada | 409/234 |
| 1955512 | 5/1971 | Fed. Rep. of Germany | 279/8 |
| 2831660 | 7/1978 | Fed. Rep. of Germany | 409/234 |
| 1017317 | 12/1952 | France | 279/8 |

*Primary Examiner*—William R. Briggs
*Attorney, Agent, or Firm*—Cyril M. Hajewski

[57] ABSTRACT

A toolholder adapter has a cylindrical body, a cylindrical shank extending axially from one end of the body, a cylindrical flange extending radially from the body, a tapered socket within the body for receiving a tapered shank toolholder, and a clamping nut on the body which has inwardly projecting tabs that are positioned to bear against the flange of the tapered shank toolholder to clamp it in the socket. The toolholder adapter is dimensioned to fit in the tool storage magazine of a machine tool and to be handled by the automatic tool changer thereof.

1 Claim, 6 Drawing Figures

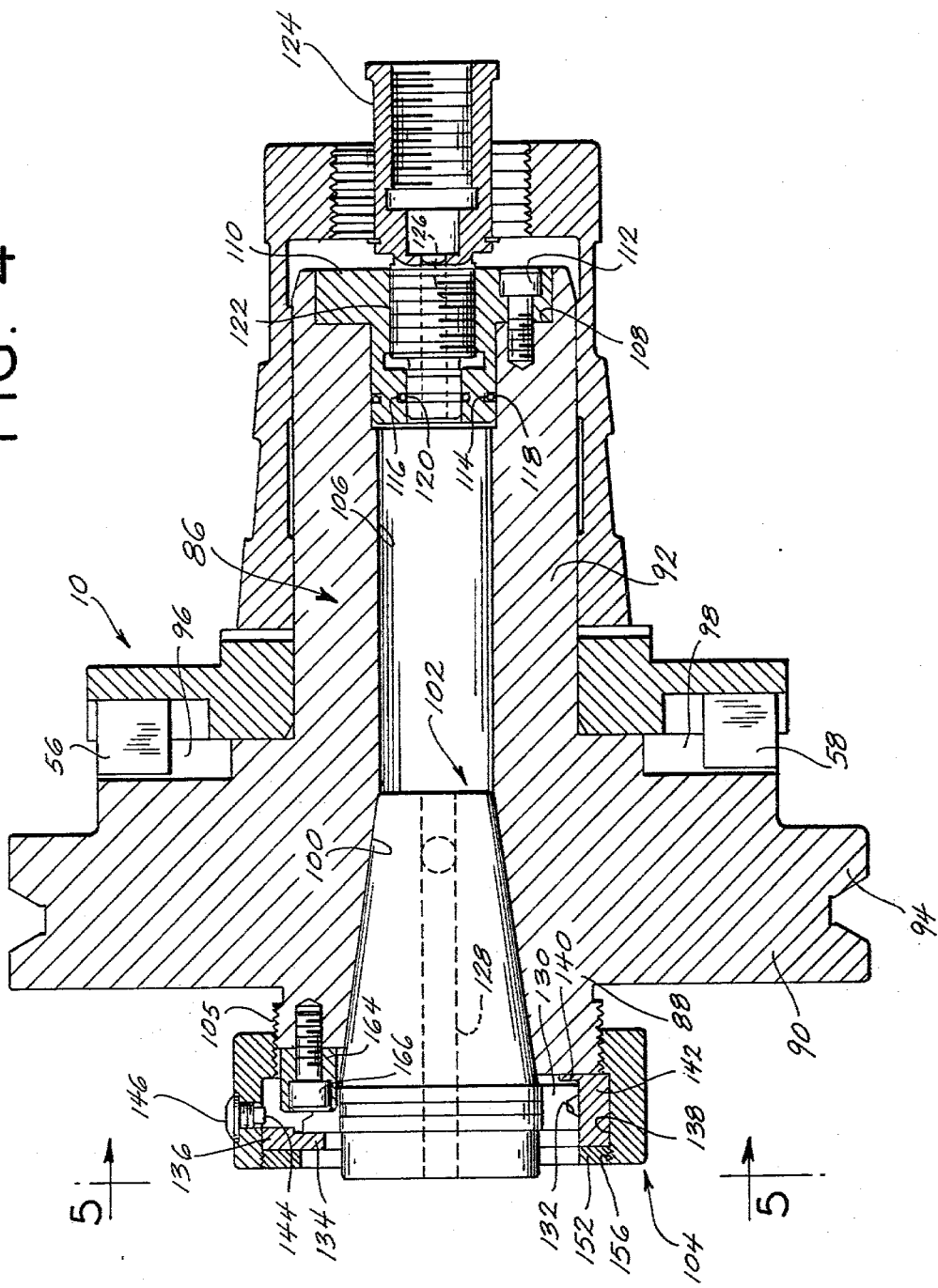

TOOLHOLDER ADAPTER

BACKGROUND OF THE INVENTION

This invention relates to toolholders for machine tools having automatic tool changers.

In the past, some machine tools with automatic tool changers used cylindrical shank toolholders and others used tapered shank toolholders. The tapered shank toolholders could not be used in the machine tools that were designed to use cylindrical shank toolholders.

The principal object of this invention is to provide a toolholder adapter that makes it possible to use tapered shank toolholders in machine tools that are designed to use cylindrical shank toolholders.

SUMMARY OF THE INVENTION

The toolholder adapter of this invention includes a cylindrical body, a cylindrical shank extending axially from one end of the body, a cylindrical flange extending radially from the body, a tapered socket within the body for receiving a tapered shank toolholder, and means on the body for bearing against the flange on the tapered shank toolholder to clamp the toolholder in the tapered socket.

BRIEF DESCRIPTION OF THE DRAWINGS

FIG. 4 is an axial sectional view of a second embodiment of this invention mounted in the spindle of a machine tool with a tapered shank toolholder clamped therein;

DESCRIPTION OF THE PREFERRED EMBODIMENTS

Figure 1:
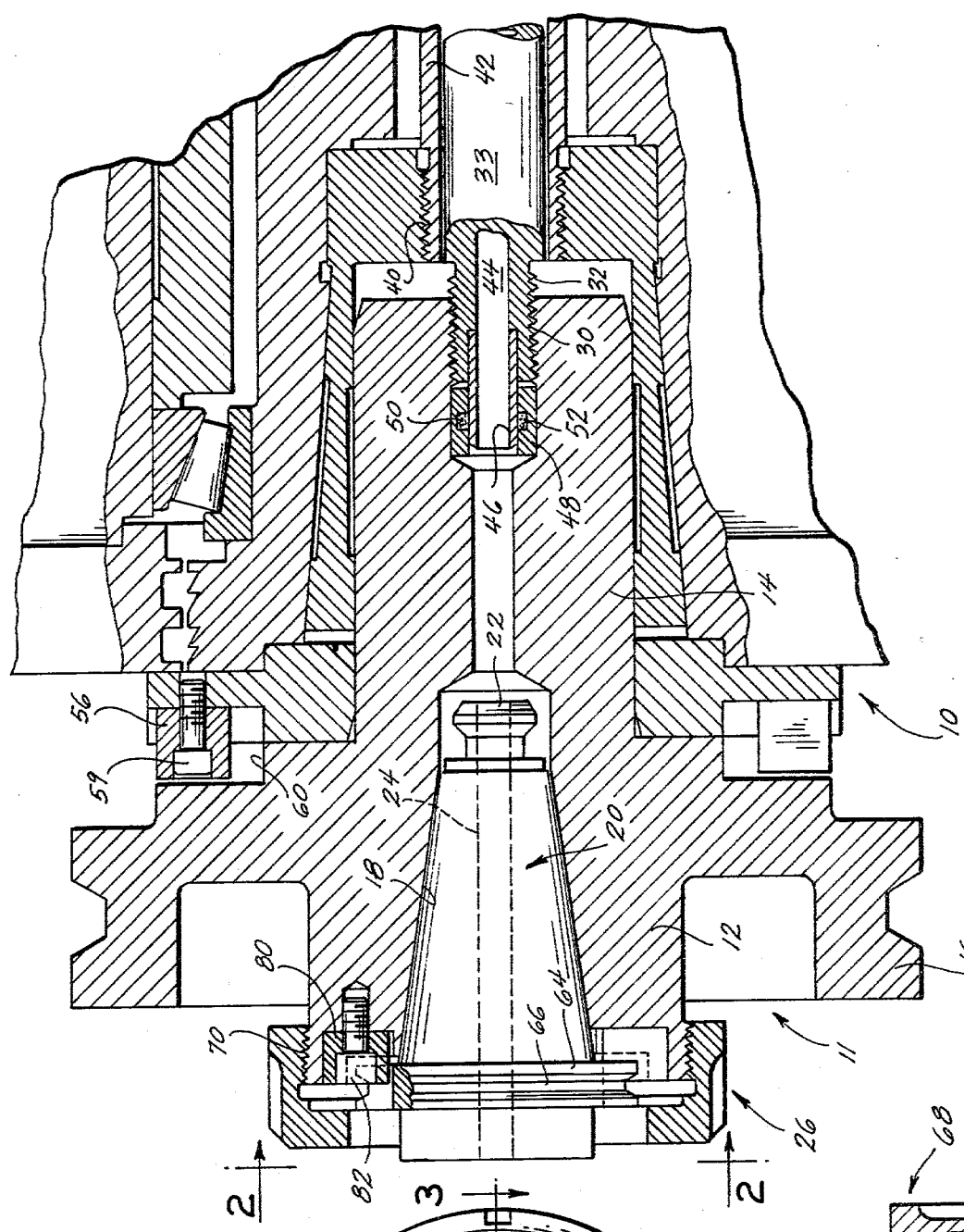
FIG. 1 is an axial sectional view of an embodiment of this invention mounted in the spindle of a machine tool with a tapered shank toolholder clamped therein.

FIG. 1 is an axial sectional view of one embodiment of the invention mounted in the spindle 10 of a machine tool which is designed to handle relatively large cylindrical shank toolholders. The toolholder adapter 11 has a cylindrical body 12, a cylindrical shank 14 which extends axially from one end of body 12, and a cylindrical flange 16 which extends radially from body 12. A tapered socket 18 is formed in body 12 to receive the shank of a tapered shank toolholder 20. Toolholder 20 has a conventional retention knob 22 on its inner end and includes a central duct 24 for introducing coolant through the tool. Although no tool is shown in toolholder 20, it will be understood by those skilled in the art that toolholder 20 is adapted to hold any one of a number of different tools.

Retention knob 22, which is used to clamp toolholder 20 in a spindle when toolholder 20 is used alone, does not serve any function when toolholder 20 is mounted in adapter 11. Toolholder 20 is held in adapter 11 by a clamping nut 26 which is described hereinafter.

Toolholder adapter 11 has a chamber 28 formed therein at the inner end of tapered socket 18. Chamber 28 is large enough to contain retention knob 22. A threaded opening 30 in the end of shank 14 is adapted to receive a conventional threaded end 32 of a drawbolt 33 which is rotated by conventional means not shown to secure shank 14 to spindle 10. Spindle 10 has a collet clamp 34 which is dimensioned to receive shank 14 and has a tapered outer surface 36 which is slidably mounted within a tapered socket 38 in spindle 10. Collet clamp 34 is attached by screw threads 40 to a collet tube 42 which surrounds drawbolt 33 and is axially movable within spindle 10 to open and close collet clamp 34.

Collet clamp 34 is shown in the clamped position in FIG. 1. To unclamp collet 34, collet tube 42 is moved to the left in FIG. 1 by conventional means not shown in the drawings. This allows collet clamp 34 to expand sufficiently to slidably receive cylindrical shank 14. Movement of collet tube 42 and collet clamp 34 to the right in FIG. 1 then clamps collet clamp 34 to shank 14. Collet clamp 34 is clamped to shank 14 before the threaded end 32 of drawbolt 33 is screwed into threaded opening 30 in shank 14.

Drawbolt 33 has a duct 44 formed therein through which coolant can be pumped by conventional means not shown. An insertion tube 46 extends from the end of drawbolt 33 and enters a sleeve 48 in shank 14. An O-ring 50 is seated in a groove 52 in sleeve 48 to provide a seal between insertion tube 46 and sleeve 48. A duct 54 is shank 14 extends between the end of sleeve 48 and the adjacent end of chamber 28. Coolant flows from insertion tube 46 through duct 54 and chamber 28 into duct 24 of toolholder 20.

A pair of drive keys 56 and 58 are attached to spindle 10 by machine screws 59 and engage drive slots 60 and 62, respectively, in adapter 11 to lock adapter 11 for rotation with spindle 10.

Figure 2:
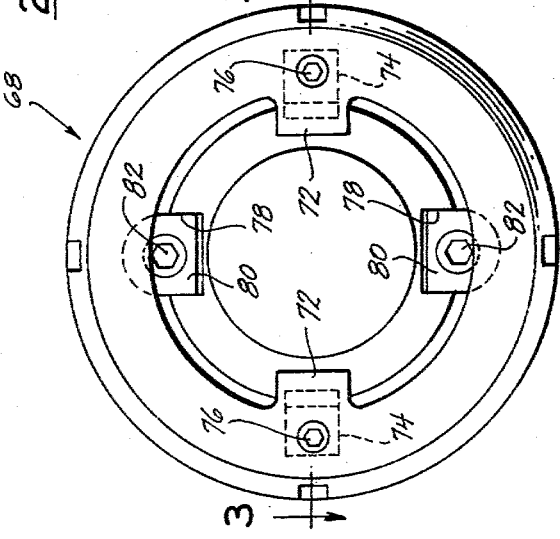
FIG. 2 is a front elevational view taken on the line 2—2 of FIG. 1.
Figure 3:
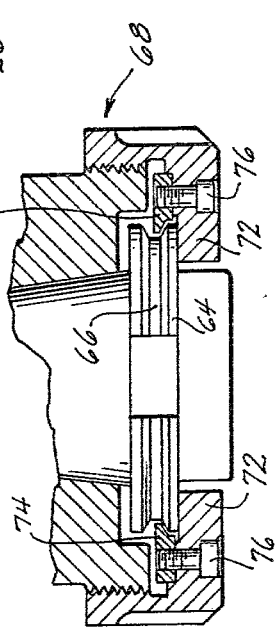
FIG. 3 is a fragmentary axial sectional view taken on the line 3—3 of FIG. 2.

Tapered shank toolholder 20 has a flange 64 with a V-groove 66 therein. Flange 64 and V-groove 66 adapt toolholder 20 to be handled by a conventional automatic tool changer. However, in this invention, flange 64 and V-groove 66 are used to clamp toolholder 20 in socket 18 of toolholder adapter 11. This is done by means of clamping nut 26 which is screwed on threads 70 on the front portion of adapter body 12. Clamping nut 26 has a pair of inwardly projecting tabs 72 (FIGS. 2 and 3) which bear against the front edge of flange 64 to press tapered shank toolholder 20 into socket 18 when clamping nut 26 is tightened. A pair of inner tabs 74 (FIG. 3) are attached by machine screws 76 to clamping nut 26 beneath tabs 72 in position to engage the front edge of V-grooves 66. Inner tabs 74 serve to pull toolholder 20 out of socket 18 when clamping nut 26 is loosened.

The flange 64 of tapered shank toolholder 20 has a pair of opposed drive slots 78 (FIG. 2) which are engaged by drive keys 80 when toolholder 20 is fully seated in socket 18. Drive keys 80 are fastened to the front portion of adapter body 12 by machine screws 82. When clamping nut 26 is first engaged with flange 64, inner tabs 74 are aligned with drive slots 78 and are inserted into drive slots 78 to place inner tabs 74 in the interior of groove 66. Clamping nut 26 is then rotated manually to clamp toolholder 20 in socket 18.

The flange 16 of toolholder adapter 11 has a V-groove 84 (FIG. 1) to enable the adapter to be handled by an automatic tool changer. Cylindrical flange 16 and groove 84 therein are dimensioned to fit the automatic tool changer. When tapered shank toolholder 20 has been clamped in socket 18 by clamping nut 26, the toolholder adapter 11 can be stored in a tool magazine and can be handled by a conventional automatic tool changer.

Figure 6:
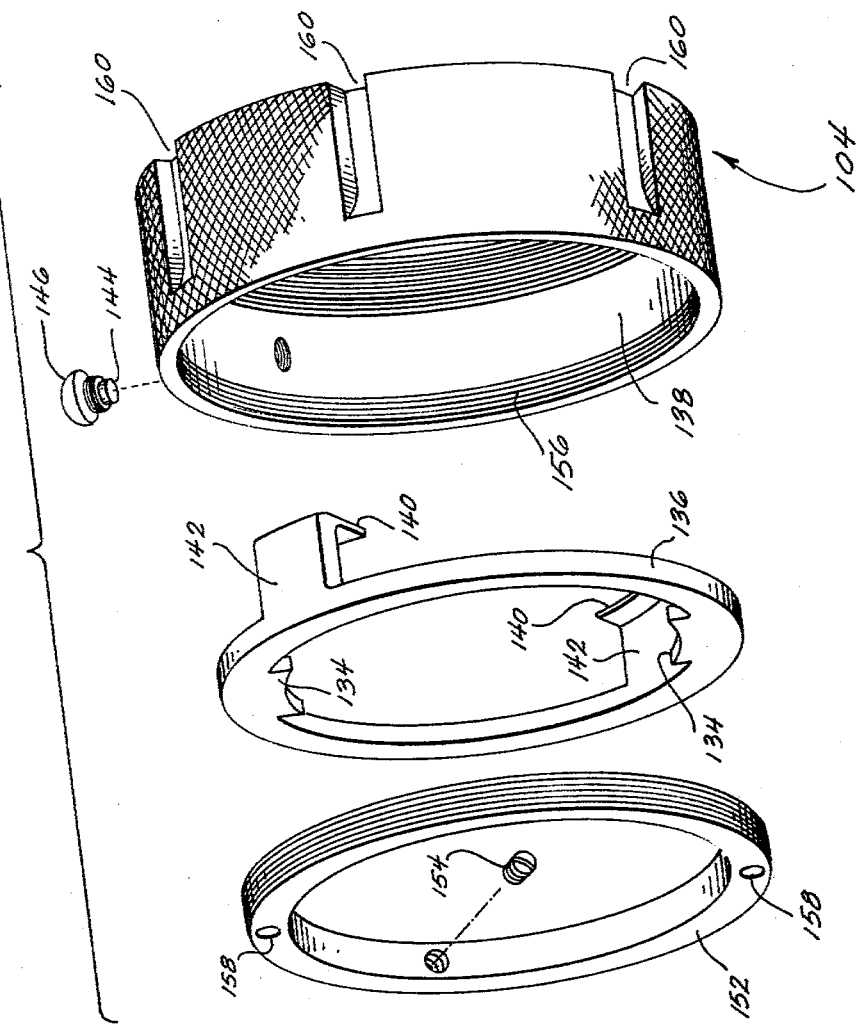
FIG. 6 is an exploded perspective view of the clamping nut and its associated parts.
Figure 5:
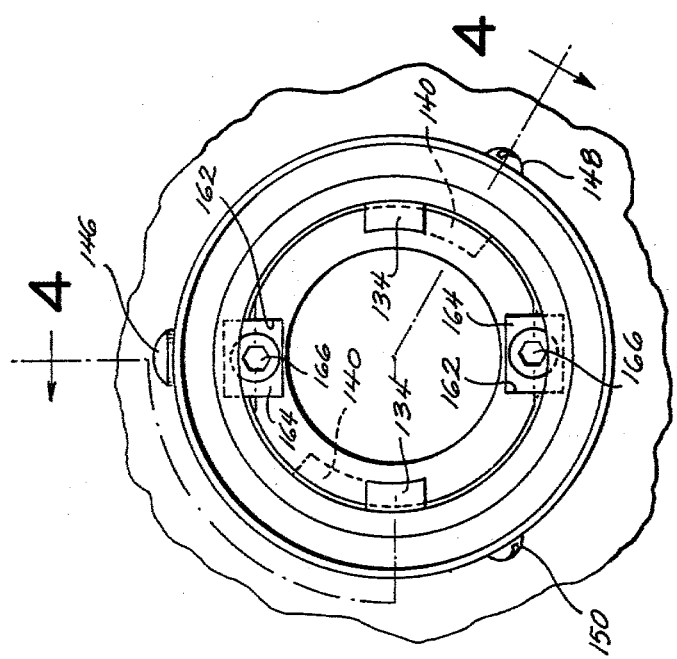
FIG. 5 is a front elevational view taken on the line 5—5 of FIG. 4.

FIGS. 4, 5 and 6 show another embodiment of the invention. Toolholder adapter 86 (FIG. 4) has a cylindrical body 88, a flange 90 extending radially outwardly from body 88, and a cylindrical shank 92 extending axially rearwardly from body 88. Flange 90 has a V-groove 94, and flange 90 and V-groove 94 are dimensioned to be handled by an automatic tool changer. Cylindrical shank 92 is dimensioned to fit into a spindle 10. A pair of drive slots 96 and 98 are formed in the rear of flange 90 to coact with drive keys 56 and 58 on spindle 10 to rotate adapter 86 with spindle 10.

A tapered socket 100 is formed in the front end of body 88 to receive a tapered shank toolholder 102. Tapered shank toolholder 102 would normally have a retention knob on its rear end, but since the retention knob is non-functional in this invention, it can be omitted. Toolholder 102 is clamped in socket 100 by a clamping nut 104 which engages threads 105 on the front of body 88. Clamping nut 104 will be described in detail hereinafter.

Shank 92 has a relatively large duct 106 extending from the rear end of socket 100 to the rear of shank 92. Duct 106 is enlarged at 108 to receive a flanged insert 110 which is attached to the end of shank 92 by machine screws 112. Insert 110 is grooved at 114 and 116 to receive O-rings 118 and 120, respectively, to act as coolant seals. Insert 110 has a threaded opening 122 for receiving the threaded end of a drawbolt 124. Drawbolt 124 has a central duct 126 through which coolant is conducted to duct 106 and then through duct 128 in toolholder 102 to the tool therein, which is not shown in the drawings.

Toolholder 102 has a flange 130 with a V-groove 132 therein. Flange 130 and groove 132 are dimensioned to be handled by an automatic tool changer. However, in this invention, flange 130 is not used for handling but is rather used to clamp toolholder 102 into socket 100. Pressure is applied against the front of flange 130 by a pair of radially inwardly projecting tabs 134 (FIG. 5) which are formed on a ring 136 (FIGS. 4 and 6) which is rotatably mounted within a groove 138 in clamping nut 104. A second pair of radially inwardly projecting tabs 140 are formed on segments 142 which project rearwardly from ring 136. Tabs 140 are positioned to bear against the rear of flange 130 to push flange 130 outwardly when clamping nut 104 is unscrewed. Rotation of ring 136 within groove 138 is limited by abutment of rearwardly projecting segments 142 with the end 144 of a machine screw 146 (FIG. 4). End 144 projects through clamping nut 104 and abuts against segments 142. Two balancing machine screws 148 and 150 are positioned at 120° intervals on the periphery of clamping nut 104. However, machine screws 148 and 150 do not extend completely through clamping nut 104, and thus, do not act as abutments. Machine screws 148 and 150 only serve to counterbalance abutment screw 146.

A threaded ring 152 (FIGS. 4 and 6) serves to hold ring 136 within groove 138. Threaded ring 152 is locked in position with set screw 154 after it is screwed into threads 156 on the front end of clamping nut 104. A pair of blind holes 158 are formed in the front surface of threaded ring 152 at diametrically spaced locations to enable ring 152 to be screwed into threads 156 by a special tool (not shown) which has studs that fit into holes 158. A plurality of circumferentially spaced axial slots 160 are formed in the outer surface of clamping nut 104 to enable nut 104 to be tightened by a suitable wrench.

Flange 130 (FIG. 4) has two diametrically opposed drive slots 162 (FIG. 5) which engage drive keys 164 on body 88. Drive keys 164 are attached to body 88 by machine screws 166. When clamping nut 104 is placed on toolholder 102, inner tabs 140 are aligned with and pass through drive slots 162 and then are rotated manually to the position shown in FIG. 5.

Clamping nut 104 along with its associated rings 136 and 152 and machine screws 146, 148 and 150 are available as an off the shelf item which is called a Quick-Change Locknut and is used to clamp tapered shank toolholders to spindles or chucks.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, we hereby claim as our invention:

1. A toolholder adapter for use in combination with a machine tool which includes a spindle adapted to receive a cylindrical shank toolholder and to clamp said toolholder thereto, said toolholder adapter comprising:
   a cylindrical body;
   a cylindrical shank extending axially outwardly from one end of said body, said shank being dimensioned to fit in said spindle;
   means on said adapter for engagement by the draw bar of a machine tool,
   means on said adapter for engagement by the grips of a tool change, arm of a machine tool;
   a tapered socket in said body opening on the end thereof opposite said shank, said socket being dimensioned to receive a tapered shank toolholder;
   a cylindrical flange on said tapered shank toolholder, said flange having a peripheral groove;
   a clamping nut;
   threads on the end of said body adjacent to said tapered socket for receiving said clamping nut;
   a pair of radially inwardly projecting tabs on said clamping nut for bearing against the outer face of said second flange;
   a pair of drive slots in said second flange; and
   a pair of radially inwardly projecting tabs on said clamping nut positioned to engage in said peripheral groove to pull said tapered shank toolholder out of said tapered socket when said clamping nut is unscrewed.

* * * * *